United States Patent
Foti et al.

(10) Patent No.: US 12,232,020 B2
(45) Date of Patent: Feb. 18, 2025

(54) SLICE AND/OR SUBSCRIBER IDENTIFICATION MODULE DEVICE LOCK

(71) Applicant: Telefonaktiebolaget LM Ericsson (publ), Stockholm (SE)

(72) Inventors: George Foti, Dollard des Ormeaux (CA); Ankur Dauneria, New Delhi (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 357 days.

(21) Appl. No.: 17/786,343

(22) PCT Filed: Dec. 19, 2019

(86) PCT No.: PCT/IB2019/061123
§ 371 (c)(1),
(2) Date: Jun. 16, 2022

(87) PCT Pub. No.: WO2021/123892
PCT Pub. Date: Jun. 24, 2021

(65) Prior Publication Data
US 2023/0023278 A1  Jan. 26, 2023

(51) Int. Cl.
*H04W 48/16* (2009.01)
*H04W 88/06* (2009.01)

(52) U.S. Cl.
CPC ............ *H04W 48/16* (2013.01); *H04W 88/06* (2013.01)

(58) Field of Classification Search
CPC ...... H04W 48/00; H04W 48/16; H04W 88/06
See application file for complete search history.

(56) References Cited

U.S. PATENT DOCUMENTS 8,965,366 B1 * 2/2015 Somayajula .......... H04W 60/00
455/418
10,306,456 B2 * 5/2019 Säkkinen .............. H04W 48/16
(Continued)

FOREIGN PATENT DOCUMENTS

EP  2866165 A1  4/2015
EP  3 557 913 A1  10/2019
(Continued)

OTHER PUBLICATIONS

U.S. Appl. No. 62/887,881, filed 2019.*
(Continued)

*Primary Examiner* — Dung B Huynh
(74) *Attorney, Agent, or Firm* — Weisberg I.P. Law, P.A.

(57) ABSTRACT

A method, apparatus, and system are provided for slice and/or subscriber identification module (SIM) device locking/unlocking. In one embodiment, a method implemented in a user equipment, UE, having one or more subscriber identification module, SIM, is provided. The method includes activating one or more subscriber identification module, SIM for a UE. The method includes, as a result of activating, initiating a request to register the UE with a network, and receiving allowed Network Slice Selection Assistance Information, NSSAI. The method includes associating received one or more single-NSSAI, S-NSSAI, indicated by the allowed NSSAI to one of the one or more SIM in the UE according to a policy. The method includes using one of the one or more S-NSSAI associated to one of the activated SIM to establish a Packet Data Unit, PDU, session.

13 Claims, 8 Drawing Sheets

(56) References Cited

U.S. PATENT DOCUMENTS

| | | | | |
|---|---|---|---|---|
| 11,146,948 | B1* | 10/2021 | Uehling | H04W 12/30 |
| 2008/0090614 | A1* | 4/2008 | Sicher | H04W 8/205 |
| | | | | 455/414.1 |
| 2010/0167738 | A1* | 7/2010 | Kim | H04W 48/16 |
| | | | | 455/435.2 |
| 2012/0129495 | A1* | 5/2012 | Chae | G06F 3/0486 |
| | | | | 345/173 |
| 2012/0149372 | A1* | 6/2012 | Lee | H04W 4/029 |
| | | | | 455/435.1 |
| 2014/0341184 | A1* | 11/2014 | Dhanda | H04W 72/51 |
| | | | | 370/337 |
| 2015/0071442 | A1* | 3/2015 | Wang | H04L 9/3226 |
| | | | | 380/270 |
| 2015/0116218 | A1* | 4/2015 | Yang | G06F 3/0486 |
| | | | | 345/158 |
| 2015/0215773 | A1* | 7/2015 | Bai | H04M 17/026 |
| | | | | 455/418 |
| 2015/0245195 | A1* | 8/2015 | Zhao | H04W 12/37 |
| | | | | 455/418 |
| 2016/0021521 | A1* | 1/2016 | Lee | H04W 76/50 |
| | | | | 455/404.1 |
| 2016/0050209 | A1* | 2/2016 | Govande | H04L 63/101 |
| | | | | 726/7 |
| 2016/0309320 | A1* | 10/2016 | Piscopo, Jr. | H04W 8/06 |
| 2017/0205259 | A1* | 7/2017 | Jang | G06Q 10/20 |
| 2017/0245137 | A1* | 8/2017 | Cho | H04W 8/28 |
| 2018/0176765 | A1* | 6/2018 | Bharadwaj | H04W 8/183 |
| 2018/0191695 | A1* | 7/2018 | Lindemann | H04L 63/0853 |
| 2018/0310236 | A1* | 10/2018 | Kumar | H04W 8/18 |
| 2018/0317157 | A1* | 11/2018 | Baek | H04W 28/16 |
| 2019/0029065 | A1* | 1/2019 | Park | H04W 8/08 |
| 2019/0044980 | A1* | 2/2019 | Russell | H04L 65/1073 |
| 2019/0230556 | A1* | 7/2019 | Lee | H04W 28/16 |
| 2019/0239070 | A1* | 8/2019 | Shin | H04W 4/80 |
| 2019/0297148 | A1* | 9/2019 | Zong | H04W 36/13 |
| 2019/0380104 | A1 | 12/2019 | Vrzic et al. | |
| 2019/0380157 | A1* | 12/2019 | Mori | H04W 8/18 |
| 2020/0021980 | A1* | 1/2020 | Schouler | H04W 8/205 |
| 2020/0037387 | A1* | 1/2020 | Lee | H04W 48/16 |
| 2020/0068647 | A1* | 2/2020 | Jha | H04W 76/15 |
| 2020/0120589 | A1* | 4/2020 | Velev | H04W 48/18 |
| 2020/0137675 | A1* | 4/2020 | Park | H04W 68/005 |
| 2020/0220858 | A1* | 7/2020 | Ou | H04W 12/06 |
| 2020/0267554 | A1* | 8/2020 | Faccin | H04L 63/101 |
| 2020/0280854 | A1* | 9/2020 | Kunz | H04W 12/0431 |
| 2020/0296660 | A1* | 9/2020 | Wang | H04W 48/16 |
| 2020/0296777 | A1* | 9/2020 | Tang | H04W 4/24 |
| 2020/0305001 | A1* | 9/2020 | Li | H04W 12/10 |
| 2020/0322884 | A1* | 10/2020 | Di Girolamo | H04W 12/06 |
| 2020/0359291 | A1* | 11/2020 | Ramle | H04W 48/16 |
| 2020/0359295 | A1* | 11/2020 | Huang-Fu | H04W 80/10 |
| 2020/0359440 | A1* | 11/2020 | Qiao | H04W 76/15 |
| 2020/0389835 | A1* | 12/2020 | Talebi Fard | H04W 48/06 |
| 2020/0413241 | A1* | 12/2020 | Park | H04W 76/22 |
| 2021/0051468 | A1* | 2/2021 | Baskaran | H04W 48/16 |
| 2021/0051577 | A1* | 2/2021 | Won | H04W 48/02 |
| 2021/0058857 | A1* | 2/2021 | Huang-Fu | H04L 41/0893 |
| 2021/0092634 | A1* | 3/2021 | Kang | H04W 28/04 |
| 2021/0112513 | A1* | 4/2021 | Chun | H04W 60/00 |
| 2021/0136672 | A1* | 5/2021 | Jagannatha | H04W 48/18 |
| 2021/0227376 | A1* | 7/2021 | Jha | H04W 8/183 |
| 2021/0250854 | A1* | 8/2021 | Olvera-Hernandez | H04W 28/16 |
| 2021/0274575 | A1* | 9/2021 | Talebi Fard | H04W 76/12 |
| 2021/0282103 | A1* | 9/2021 | Zhu | H04W 76/15 |
| 2021/0345113 | A1* | 11/2021 | Parron | H04L 12/4675 |
| 2021/0359912 | A1* | 11/2021 | Tervonen | H04W 28/16 |
| 2021/0360564 | A1* | 11/2021 | Kawasaki | H04W 60/00 |
| 2021/0392574 | A1* | 12/2021 | Tiwari | H04W 68/12 |
| 2021/0409934 | A1* | 12/2021 | Tiwari | H04W 12/30 |
| 2021/0409942 | A1* | 12/2021 | De Kievit | H04W 8/18 |
| 2022/0007264 | A1* | 1/2022 | Takakura | H04W 76/18 |
| 2022/0015174 | A1* | 1/2022 | Aramoto | H04W 76/18 |
| 2022/0022128 | A1* | 1/2022 | Takakura | H04W 8/26 |
| 2022/0046532 | A1* | 2/2022 | Hu | H04W 48/18 |
| 2022/0053448 | A1* | 2/2022 | Velev | H04W 8/183 |
| 2022/0078742 | A1* | 3/2022 | Tiwari | H04W 60/005 |
| 2022/0086790 | A1* | 3/2022 | Wang | H04W 60/04 |
| 2022/0104117 | A1* | 3/2022 | Xu | H04W 48/18 |
| 2022/0159616 | A1* | 5/2022 | Stojanovski | H04W 68/025 |
| 2022/0165146 | A1* | 5/2022 | Daoura | H04W 8/005 |
| 2022/0191696 | A1* | 6/2022 | Yoshizawa | H04L 9/3213 |
| 2022/0210757 | A1* | 6/2022 | Hong | H04W 60/005 |
| 2022/0225275 | A1* | 7/2022 | Ying | H04W 68/005 |
| 2022/0240213 | A1* | 7/2022 | Ly | H04W 60/04 |
| 2022/0248216 | A1* | 8/2022 | Lee | H04W 48/16 |
| 2022/0264522 | A1* | 8/2022 | Brusilovsky | H04W 48/18 |
| 2022/0264683 | A1* | 8/2022 | Liu | H04W 48/16 |
| 2022/0272620 | A1* | 8/2022 | Ninglekhu | H04W 48/06 |
| 2022/0312473 | A1* | 9/2022 | Hong | H04W 74/0833 |
| 2022/0322071 | A1* | 10/2022 | Hong | H04W 76/15 |
| 2022/0346052 | A1* | 10/2022 | Foti | H04W 60/04 |
| 2022/0360977 | A1* | 11/2022 | Kim | H04L 65/80 |
| 2022/0361134 | A1* | 11/2022 | Chandramouli | H04W 8/183 |
| 2022/0394456 | A1* | 12/2022 | Liu | H04W 48/18 |
| 2022/0394458 | A1* | 12/2022 | Liang | H04W 76/15 |
| 2023/0093965 | A1* | 3/2023 | Velev | H04W 68/12 |
| | | | | 455/458 |
| 2024/0137336 | A1* | 4/2024 | Xu | H04W 8/205 |

FOREIGN PATENT DOCUMENTS

| | | | |
|---|---|---|---|
| WO | 2019019037 | A1 | 1/2019 |
| WO | 2019/222604 | A1 | 11/2019 |

OTHER PUBLICATIONS

European Communication Pursuant to Article 94(3) EPC dated Feb. 9, 2024 issued in corresponding European Application No. 19 838 962.9, consisting of 6 pages.

International Search Report and Written Opinion dated Aug. 19, 2020 for International Application No. PCT/IB2019/061123, consisting of 13 pages.

3GPP TSG-SA WG2 Meeting #132 S2-1903387; Change Request; Title: Introduction of Slice-Specific Authentication and Authorisation; Source to WG: Ericsson; Source to TSG: S2; Work item code: eNS; Location and Date: Xi'an, China, Apr. 8-12, 2019, consisting of 8 pages.

3GPP TS 23.502 V16.2.0; 3rd Generation Partnership Project; Technical Specification Group Services and System Aspects; Procedures for the 5G System (5GS); Stage 2 (Release 16); Sep. 2019, consisting of 525 pages.

Requirements for Multi SIM Devices Version 5.0 GSM Association; Official Document TS.37—Requirements for Multi SIM Devices; Dec. 4, 2018, consisting of 45 pages.

* cited by examiner

SLICE AND/OR SUBSCRIBER IDENTIFICATION MODULE DEVICE LOCK

CROSS-REFERENCE TO RELATED APPLICATION

This application is a Submission Under 35 U.S.C. § 371 for U.S. National Stage Patent Application of International Application Number: PCT/IB2019/061123, filed Dec. 19, 2019 entitled "SLICE AND/OR SUBSCRIBER IDENTIFICATION MODULE DEVICE LOCK," the entirety of which is incorporated herein by reference.

TECHNICAL FIELD

The present disclosure relates to wireless communications and, in particular, to apparatuses and methods for slice and/or subscriber identification module (SIM) device locking/unlocking.

BACKGROUND

Support for network slicing in IP Multimedia Subsystem (hereinafter IMS) is currently being considered by the $3^{rd}$ Generation Partnership Project (3GPP) as part of its $5^{th}$ Generation (5G, is also referred to as New Radio (NR)) standards. A network slice generally corresponds to a set of network resources (e.g., network functions) which have been allocated to a slice to support one or more specific services on the network. Accordingly, services can be provided more flexibly depending on a service or user as compared with older technologies. A user equipment (UE) seeking access to a service may connect to a network slice that supports the service.

A user generally configures a pattern or code to unlock a UE display screen. Conventionally, only one network is available at the UE (as per subscriber identification module (SIM)). Therefore, when the user inputs his/her pattern or code to unlock the display screen, the default network is available to use as provided by the SIM.

Now, in 5G, with introduction of network slices, there is a possible scenario where multiple network slices may be available at the UE for use. A network slice is a complete instance of a logical network itself. Each slice can offer one or more network services. Thus, having multiple network slices at the UE to use may provide the possibility for the user to use one or another slice for other/different services.

In addition, 5G UEs may be equipped with multiple SIMs (multi-SIMs), which may belong to the same or different operators. However, how to utilize multi-SIM UEs to improve the user experience is not established.

SUMMARY

Some embodiments of the present disclosure advantageously provide methods, apparatuses and systems for slice and/or subscriber identification module (SIM) device locking/unlocking.

According to a first aspect of the present disclosure, a method implemented in a user equipment, UE having one or more subscriber identification module, SIM, is provided. The method includes activating one or more subscriber identification module, SIM for a UE. The method includes, as a result of activating, initiating a request to register the UE with a network, and receiving allowed Network Slice Selection Assistance Information, NSSAI. The method includes associating received one or more single-NSSAI, S-NSSAI, indicated by the allowed NSSAI to one of the one or more SIM in the UE according to a policy. The method includes using one of the one or more S-NSSAI associated to one of the activated SIM to establish a Packet Data Unit, PDU, session.

In some embodiments of this aspect, activating the one or more SIM corresponds to unlocking the one or more SIM via one or more corresponding configured and stored swipe pattern. In some embodiments of this aspect, the method further includes associating each of the S-NSSAI of the allowed NSSAI with an activation code or an activation pattern for the activated SIM. In some embodiments of this aspect, the activation pattern includes a swipe pattern to activate a particular slice identified by an S-NSSAI. In some embodiments of this aspect, using one of the one or more S-NSSAI associated to the one of the activated SIM to establish the PDU session is enabled by activating an activation code or an activation pattern associated with the S-NSSAI of the activated SIM. In some embodiments of this aspect, the policy is one of a pre-configured UE rule and a UE Route Selection Policy, URSP, rule.

In some embodiments of this aspect, the method further includes informing an application that the association of the application to the PDU session failed if at least one of: the one of the one or more S-NSSAI is associated to an inactive SIM; and the one of the one or more S-NSSAI is not enabled in the activated SIM. In some embodiments of this aspect, the method further includes configuring a first SIM of the one or more SIM to be activated if a user-input matches at least a first display unlock pattern; and configuring a second SIM of the one or more SIM to be activated if the user-input matches at least a second display unlock pattern, the second display unlock pattern being different from the first display unlock pattern.

According to another aspect of the present disclosure, a user equipment, UE, with one or more subscriber identification module, SIM, and comprising processing circuitry is provided. The processing circuitry is configured to cause the UE to perform the method according to any one of the aspects discussed herein and above.

According to another aspect of the present disclosure, a user equipment, UE, with one or more subscriber identification module, SIM, is adapted to perform the method according to any one of the aspects discussed herein and above.

According to another aspect of the present disclosure, a user equipment, UE, having one or more modules, adapted to perform the method according to any one of the aspects discussed herein and above is provided.

According to another aspect of the present disclosure, a computer program comprising instructions which, when executed on at least one processor, cause the at least one processor to carry out the method according to any one of the aspects discussed herein and above is provided.

According to another aspect of the present disclosure, a carrier containing the computer program, wherein the carrier is one of an electronic signal, an optical signal, a radio signal, or a computer readable storage medium is provided.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Some embodiments of the present disclosure provide for configuring a UE's display screen unlock pattern to be associated with a particular SIM and/or one or more particular network slices. For example, the user may input a specific display screen unlock pattern (e.g., activation code or pattern) over another pattern to essentially select a SIM to activate, or switch between SIMs and/or slices associated to the activated SIM based on the activation code/pattern used by the user to unlock the UE display screen in order to use it for some purpose.

In some embodiments, with multiple slices (or multiple networks providing different service offerings as part of the corresponding slices) available at the UE, the UE may use one or more slices that are associated to a particular SIM that is activated based on an unlock pattern exercised at the UE. In some embodiments, the slice that will be used by the UE to e.g., establish a Packet Data Unit (PDU) session, may change from the slice which was present when the UE was in a display screen lock state, to the slice(s) that are associated to the particular SIM that is activated by the user as per a display screen unlock option used by the user to unlock the UE display screen.

Figure 1:
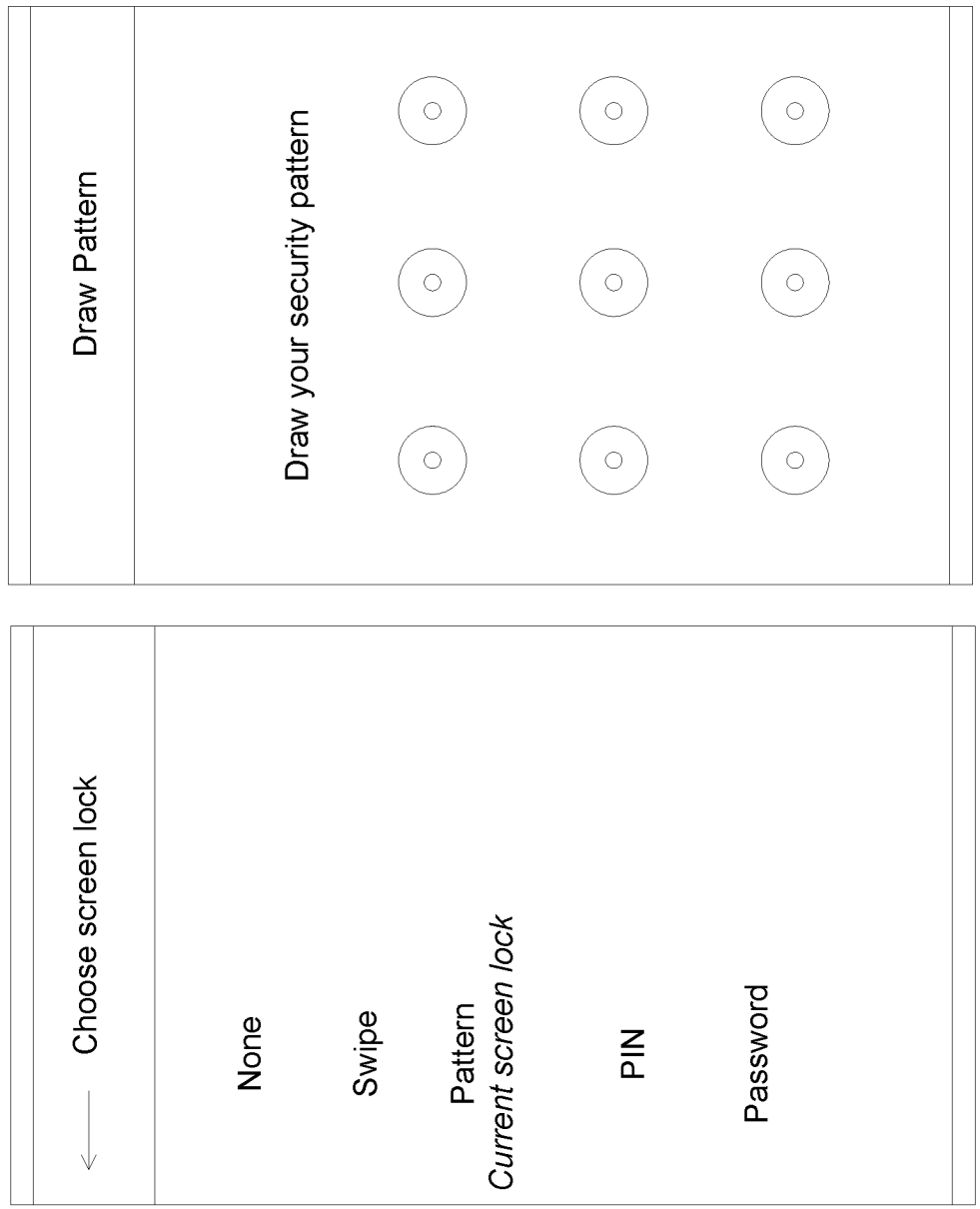
FIG. 1 shows example screenshots illustrating an example of how to use a password, PIN or pattern to unlock a screen of a user equipment (UE)

As shown in FIG. 1, example screenshots of a UE display screen unlock configuration show that it is possible to use a password, a personal identification number (PIN) and a pattern to unlock the display screen. Some embodiments of the present disclosure propose to allow the user to configure in e.g., the UE settings, to map a SIM (e.g., out of multiple SIMs) to be used when a particular PIN or a password or a pattern is used to unlock the device screen. Once an unlock option is exercised at the UE, the UE unlocks the display screen and/or activates the associated SIM. When the SIM is activated, the UE may transmit a request to register with a network and receive allowed Network Slice Selection Assistance Information (NSSAI) which indicates one or more single-NSSAI. All or a subset of the indicated one or more single-NSSAI (S-NSSAI) may then be associated to the activated SIM at the UE. In some embodiments, the association of the S-NSSAI to the activated SIM may be determined by e.g., a pre-configured UE rule and/or a UE route selection policy (URSP) rule.

In some embodiments, each SIM in the UE may be considered as a separate device. Hence, the NSSAI for one SIM are not shared with another SIM. Each SIM may have its own set of stacks, own set of S-NSSAI, etc. When a SIM is selected or activated by an activation pattern or activation code, the UE may simply activate the SIM and enable or associate all the S-NSSAIs to the activated SIM. In some embodiments, this can be refined further by configuring an activation pattern or activation code that activates a SIM to also activate or enable a subset of the allowed S-NSSAIs (instead of all the allowed S-NSSAIs). Accordingly, in some embodiments, a single SIM may have multiple activation patterns/codes depending on which subset a user wants to use. This may be particularly useful for shared devices, or for other scenarios in which it may be desirable to permit use of only a subset of S-NSSAIs. Stated another way, one activation pattern/code may active SIM1 and associate an S-NSSAI to SIM1, whereas another activation pattern/code may activate SIM1 and associate a different S-NSSAI to SIM1.

In some embodiments, each S-NSSAI may be associated to an activation code or activation pattern such that e.g., the UE switches between slices identified by the S-NSSAI based on the activation code/pattern used by the user to unlock the display screen, as per configured by the user in, for example, the display screen unlock configuration setting.

In some embodiments, it may be possible that, with the presence of multiple slices, the user may set different unlock options at the UE to set/switch one slice or over other slices to be used as a default slice at the UE as per user choice, during display screen unlocking. It should be understood that the activation patterns or codes do not only activate/enable/switch between certain slices alone without activation of the SIM as well. Stated another way, the activation patterns or codes activate a SIM (or more than one SIM in some cases) and additionally, in some further embodiments, may activate the SIM in addition to all or a subset of slices (e.g., activation code 1 activates SIM 1 and all allowed slices whereas activation code 2 activates SIM1 and only a subset of slices and further, activation code 3 may active SIM1 and a different subset of the allowed slices).

In some embodiments, a single-SIM UE may provide multiple slices options to select according to the display unlock pattern input by the user. The slices options may increase in a dual/multi-SIM UE and so on. With more and more slices options available at the UE, using the unlock display screen pattern (or option) to activate/switch between SIMs and/or slices identified by S-NSSAIs may be useful for UE vendors and network operators.

Figure 2:
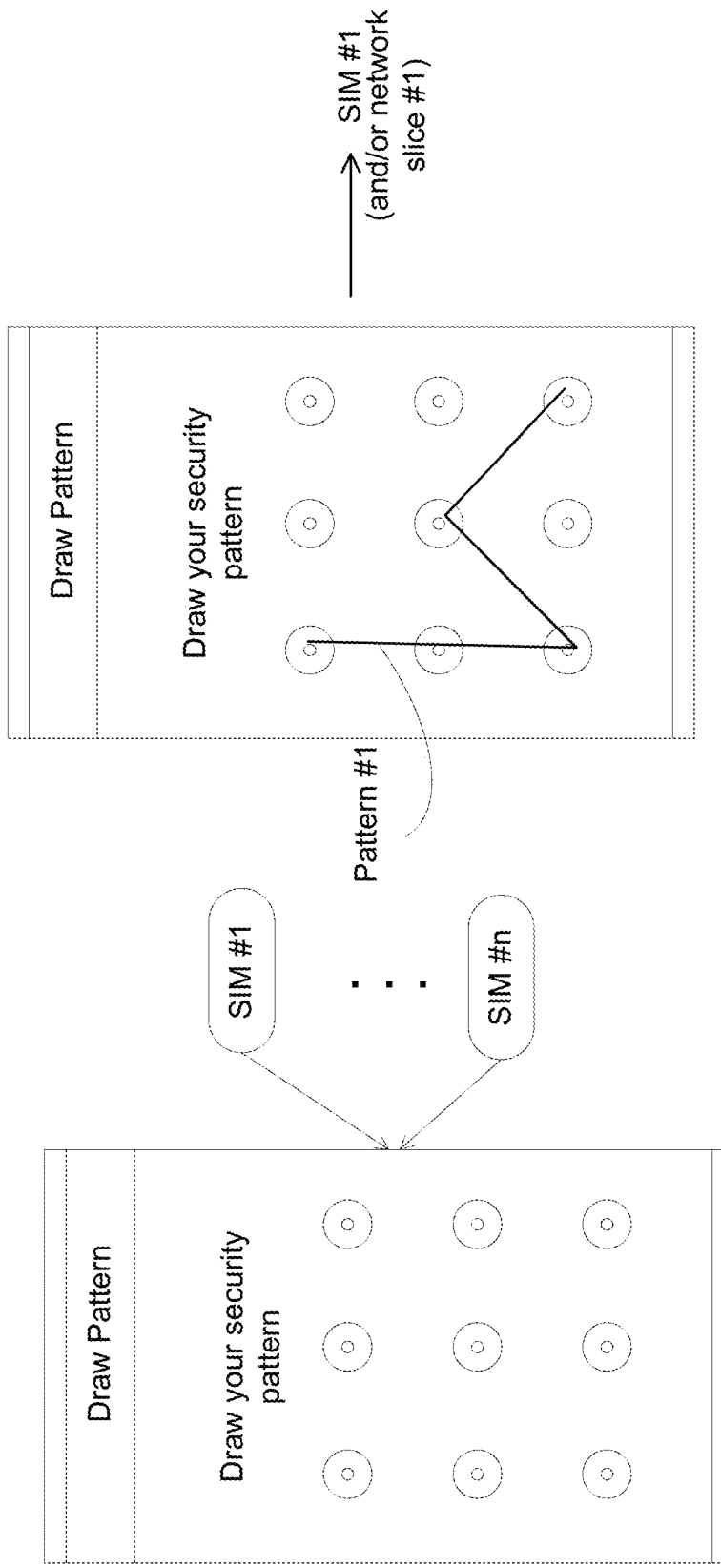
FIG. 2 is a schematic diagram illustrating example screenshots of using unlock patterns to unlock a multi-SIM UE.

FIG. 2 is an illustration showing an embodiment for multi-SIM scenarios, in which a UE may include multiple SIMs and/or one or more slices identified by S-NSSAIs may be associated to an activated SIMs. As per the unlock pattern (e.g., PIN, password, swipe pattern, etc.) used by the user to unlock the UE, a SIM (out of multiple SIMs) may be activated and/or S-NSSAIs indicated by the allowed NSSAI may be associated to the SIM (e.g., per UE rule). In some embodiments, as per an unlock pattern used by the user to unlock the UE, in addition to activation of a SIM, a slice (or a subset of slices) out of multiple slices may be associated to the activated SIM and therefore useable by the UE to establish a PDU session.

Some embodiments of the present disclosure may be useful for shared UEs (e.g., tablet, iPad, etc.). For example, an iPad is normally shared between children/family members. Each person may configure their own unlock pattern/code to unlock the shared UE. The shared UE may be configured to, upon unlocking, activate the SIM associated to the particular unlock pattern/code input by the user and which may be configured for the specific user.

In some embodiments, the particular unlock pattern/code input by the user may be associated to one or more slices that may be used by the user for services which, in some embodiments, may be different from one or more slices that may be used by another user per the unlock pattern/code associated to that other user.

Online learning may become a pillar of society and, for example, an examiner may use different 'services' to build an exam. For example, one student may be assigned all objective questions in text-based form, while another student may be assigned to listen to an audio service administering the exam audibly. Yet another student may use a video-based service for being administered the exam via video, and so on. In some embodiments, each exam type may include different telecommunication services e.g., randomly, wherein a user for the exam unlocks the particular exam service using his/her unique pattern/code/PIN, and his/her computer (UE) may be configured to use slice(s) that may be assigned in real-time on his/her computer/UE, as per the random exam type that is assigned to the particular student.

In some embodiments, a slice is assigned to a computer allotted to a user in an examination room. Here, the computer on which user sits in the examination room may be a UE. UEs can be allotted a temporary subscription for the examination. As a result of the user entering a respective PIN/code/pattern, a set of assigned slices (e.g., a set of S-NSSAIs identifying a set of slices) may be activated for the user's particular exam, which may be based on the exam question set allocated to the student.

In some embodiments, it may be possible to, e.g., determine if the exam is leaked or not, because slice and application traffic may also be observed before the exam, to observe if any exams are seen before the exam starts. Today to build such exam, application locks may be used. But institutions using network slices in the future to deliver exams to students in a digital environment, may desire to have slices locked as well to full proof cheating/exam leaking attempts (if any). For example, institutions using slices to deliver an exam question set to a set of student computers in an exam, may observe traffic with respect to these network slices to avoid cheating attempts prior to the exam. Resources may be dedicated here, because the institution at a time, examines a fixed set of students, with respect to a subject, certification, etc. Thus, the number of students taking an exam may assist in resource allocation/slice assignments at a time and location. It should be understood that the exam-based use cases discussed herein are merely non-limiting examples of how at least some of the techniques in this disclosure may be implemented in a particular scenario.

In some embodiments there are provided multi-SIM UEs that may belong to the same or different operators. In some embodiments of the present disclosure, each SIM in a UE can be associated to a different lock/unlock pattern/code using the techniques disclosed herein. In addition, in some embodiments, two or more SIMs may be associated to the same lock/unlock pattern/code e.g., as per the user display screen unlock configuration.

The Global System for Mobile Communications (GSMA), section 2.5.1 SIM selection requirements are listed in the table, Table 1, below.

TABLE 1

GSMA requirements.

| Requirement ID | Requirement |
| --- | --- |
| TS37_2.5_REQ_1 | SIM selection SHALL be implemented through operating system menus for devices with a display SIM selection using an application or Web UI MAY be used for devices without a display |
| TS37_2.5_REQ_2 | For OS, application and Web UI implementation, any restrictions in cellular technologies, bearers or bands accessible under particular configurations SHALL be clearly indicated |
| TS37_2.5_REQ_3 | The device SHALL allow the user to select a preferred SIM for data |
| TS37_2.5_REQ_4 | If the user does not select a preferred SIM, this setting SHALL default to the SIM with the highest technology generation available |
| TS37_2.5_REQ_5 | If the device implementation allows the user to configure other limitations (e.g., Preferred SIM for Voice, preferred SIM for SMS, preferred SIM for MMS) the selected options SHALL be clearly indicated |
| TS37_2.5_REQ_6 | If a multi SIM device contains a single SIM, that SIM SHALL not be allowed to change the preference |
| TS37_2.5_REQ_7 | If the SIM association with IMEI is dynamically changed, the device SHALL fully detach from the affected 3GPP/3GPP2 network(s) using the original IMEI(s), before beginning new attach procedure(s) with the new IMEI(s) |
| TS37_2.5_REQ_8 | Alteration of SIM association with SIM port SHALL be treated as new SIM insertion-specifically a modem and SIM reset SHALL be performed to ensure that all required parameters are synchronized between SIM and modem |

In existing networks, none of the above requirements presents any use of "pattern" for SIM selection. In some embodiments, the pattern may be considered a swipe pattern, a PIN, a code or a "biometric pattern" such as a fingerprint pattern for SIM activation and/or for slice activation/unlocking, etc. In short, pattern for SIM/Slice selection/unlocking has not been contemplated.

Some embodiments may advantageously, for a UE, improve the user experience since, e.g., the user may simply exercise/input a pattern to unlock the UE and the UE may automatically switch to and/or activate a particular SIM associated to that particular pattern and/or may automatically switch to and/or activate one or more slices as configured by e.g., the user. The user experience may improve even more in a multi-SIM UE with multiple SIMS and/or multiple slices to activate per user input pattern.

Some embodiments may advantageously provide for more efficient resource usage for a mobile network operator (MNO). For example if, in some embodiments, messages are exchanged between the UE and the MNO during a UE display screen unlocking, the operator may be able to save resources and sessions with respect to one slice over another, as per the option exercised by the user to unlock the UE's display screen and switch between SIMs and/or slices to use as configured at the UE. Also, in some embodiments, these features may be enabled for multi-SIM UEs as well as single-SIM UEs.

Before describing in detail exemplary embodiments, it is noted that the embodiments reside primarily in combinations of apparatus components and processing steps related to slice and/or subscriber identification module (SIM) device locking/unlocking. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a UE such as a wireless device (WD) or a radio network node.

In some embodiments, the non-limiting terms wireless device (WD) or a user equipment (UE) are used interchangeably. The UE herein can be any type of wireless device capable of communicating with a network node or another UE over radio signals. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the term "pattern" may be used to indicate an activation code, PIN, swipe pattern, biometric pattern and the like for e.g., activating one or more specific SIM(s) and/or one or more specific slice(s) according to the techniques disclosed herein and which may also be used for unlocking a UE display screen.

In some embodiments, the term "pre-configured" in the context of this disclosure may refer to the related information being defined for example in a standard, and/or being available without being received from a node, e.g. stored in memory, for example independent of receiving information from the network.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a user equipment or a network node may be distributed over a plurality of user equipments and/or network nodes. In other words, it is contemplated that the functions of the network node and user equipment described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide for slice and/or subscriber identification module (SIM) device locking/unlocking arrangements.

Figure 3:
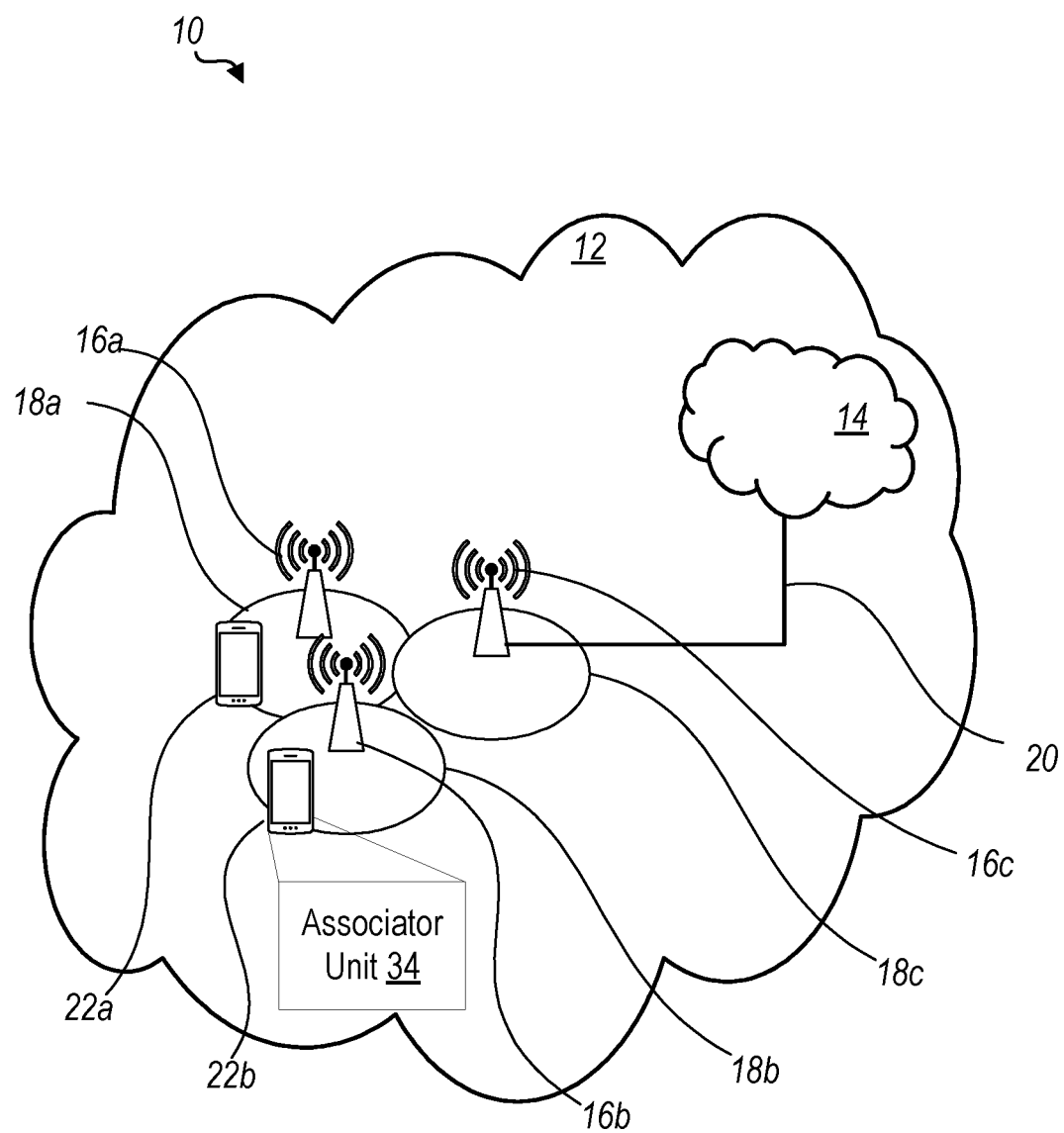
FIG. 3 is a schematic diagram of an example network architecture illustrating a communication system including user equipments (UEs) and network nodes according to one embodiment of the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first UE 22a located in coverage area 18a is configured to wirelessly connect to, or be paged by, the corresponding network node 16a. A second UE 22b in coverage area 18b is wirelessly connectable to the corresponding network node 16b. While a plurality of UEs 22a, 22b (collectively referred to as user equipments 22) are illustrated in this example, the disclosed embodiments are equally applicable to a situation where a sole UE is in the coverage area or where a sole UE is connecting to the corresponding network node 16. Note that although only two UEs 22 and three network nodes 16 are shown for convenience, the communication system may include many more UEs 22 and network nodes 16.

Also, it is contemplated that a UE 22 can be in simultaneous communication and/or configured to separately communicate with more than one network node 16 and more than one type of network node 16. For example, a UE 22 can have dual connectivity with a network node 16 that supports LTE and the same or a different network node 16 that supports NR. As an example, UE 22 can be in communication with an eNB for LTE/E-UTRAN and a gNB for NR/NG-RAN. In some embodiments, the UE 22 may be configured as a dual (or multi) SIM device having separate subscriptions with the same network and the same operator simultaneously. For example, a dual-SIM UE 22 may be connected over 3GPP Access with an Evolved Packet System (EPS) on one SIM and 5G system (5GS) on the other SIM; or the UE may be connected over 3GPP Access with EPS on both SIMs; or the UE may be connected over 3GPP Access with 5GS on both SIMs; or the multiple SIMS may be served the same or different serving networks.

A user equipment 22 is configured to include an associator unit 34 which is configured to one or more of: activate one or more subscriber identification module, SIM for a UE; as a result of activating, initiate a request to register the UE with a network, and receive allowed Network Slice Selection Assistance Information, NSSAI; associate received one or more single-NSSAI, S-NSSAI, indicated by the allowed NSSAI to one of the one or more SIM in the UE according to a policy; and use one of the one or more S-NSSAI associated to one of the activated SIM to establish a Packet Data Unit, PDU, session.

As one non-limiting example, the one or more S-NSSAI may be associated to one of the SIMs in the UE according to a policy by, for example:
as a result of the activation of SIM1 via activation pattern1 all of the S-NSSAIs indicated by the allowed NSSAI may be associated to the activated SIM and usable by the UE to establish a PDU session; and
as a result of the activation of SIM1 via other activation patterns or codes, only a subset of the S-NSSAIs indicated by the allowed NSSAI may be associated to the activated SIM in the UE 22 according to a UE rule or other policy (e.g., as a result of activation of SIM1 via activation pattern2 only S-NSSAIs identifying slices for voice may be associated to SIM1 and/or used to establish the PDU session; and as a result of activation of SIM1 via activation pattern3 only S-NSSAIs identifying slices for data may be associated to SIM1 and/or used to establish the PDU session).

Example implementations, in accordance with an embodiment, of the UE 22 and network node 16 discussed in the preceding paragraphs will now be described with reference to FIG. 4. In a communication system 10, a network node 16 is provided including hardware 58 enabling it to communicate with the UE 22. The hardware 58 may include a communication interface 60 for setting up and maintaining a wired or wireless connection with an interface of a different communication device of the communication system 10, as well as a radio interface 62 for setting up and maintaining at least a wireless connection 64 with a UE 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection which may be direct or it may pass through a core network 14 of the communication system 10 and/or through one or more intermediate networks outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16.

The communication system 10 further includes the UE 22 already referred to. The UE 22 may have hardware 80 that may include a radio interface 82 configured to set up and maintain a wireless connection 64 with a network node 16 serving a coverage area 18 in which the UE 22 is currently located. The radio interface 82 may be formed as or may include, for example, one or more RF transmitters, one or more RF receivers, and/or one or more RF transceivers. In some embodiments, the radio interface 82 may be configured to set up and maintain a wired connection with a node in the network.

The hardware 80 of the UE 22 further includes processing circuitry 84. The processing circuitry 84 may include a SIM 85. Although one SIM 85 is shown, some embodiments include more than one SIM 85. Some embodiments of the UE 22 include n SIMs 85, where n can be any number greater than 1. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 22 may further comprise software 90, which is stored in, for example, memory 88 at the UE 22, or stored in external memory (e.g., database, storage array, network storage device, etc.) accessible by the UE 22. The software 90 may be executable by the processing circuitry 84. The software 90 may include a client application 92. The client application 92 may be operable to provide a service to a human or non-human user via the UE 22. The client application 92 may interact with the user (e.g., via user inputs) to generate the user data that it provides.

The processing circuitry 84 may be configured to control any of the methods and/or processes described herein and/or to cause such methods, and/or processes to be performed, e.g., by UE 22. The processor 86 corresponds to one or more processors 86 for performing UE 22 functions described herein. The UE 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to UE 22. For example, the processing circuitry 84 of the user equipment 22 may include an associator unit 34 configured to perform UE methods discussed herein, such as the methods discussed with reference to FIG. 5 as well as other figures.

Figure 4:
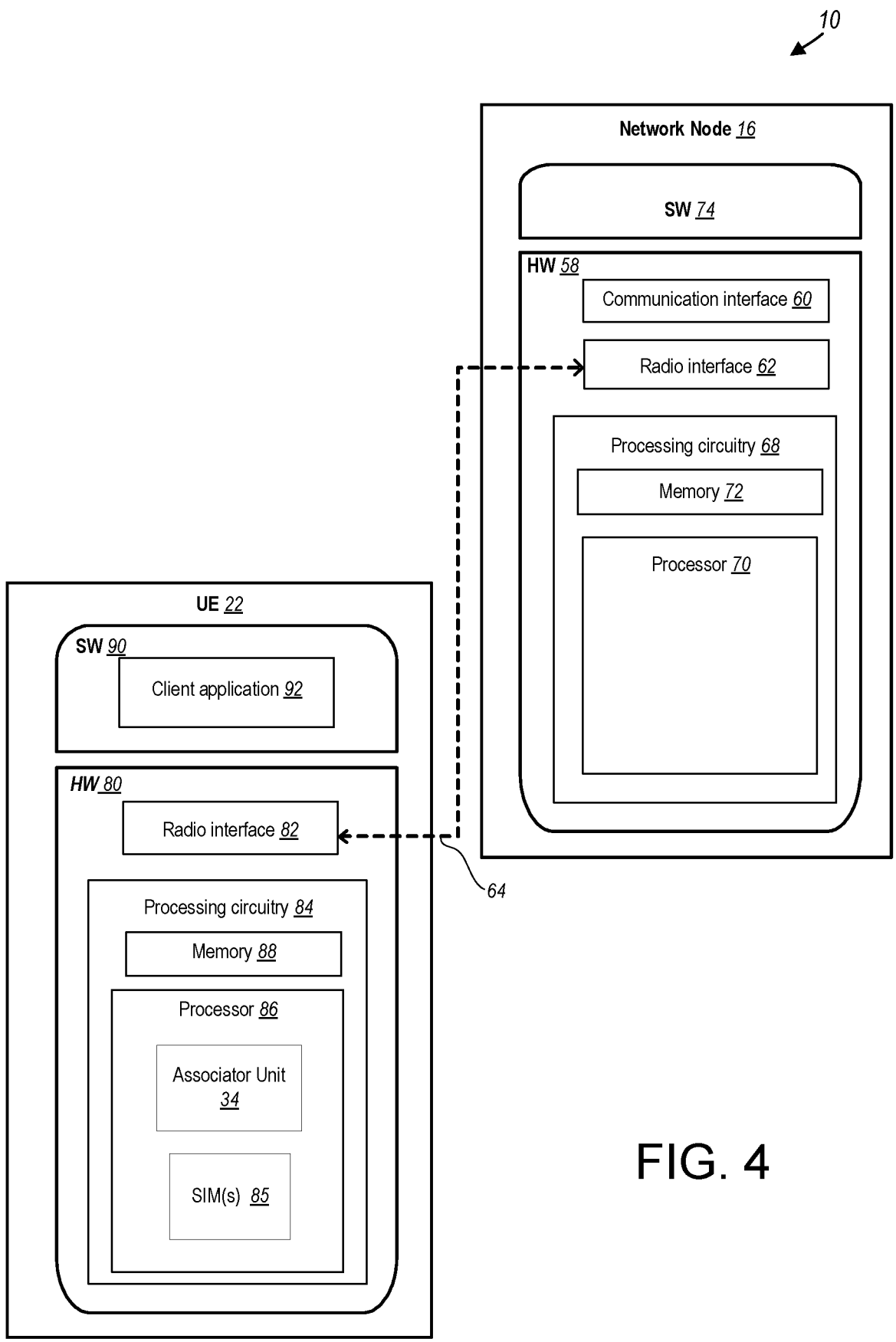
FIG. 4 is a block diagram of an example communication system including a network node and a user equipment (UE) according to one embodiment of the present disclosure.

In some embodiments, the inner workings of the network node 16 and UE 22 may be as shown in FIG. 4 and independently, the surrounding network topology may be that of FIG. 3.

Although FIGS. 3 and 4 show one or more "units" such as associator unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry. In some embodiments, the unit(s), such as associator unit 34, may be considered a module, which may be implemented in software and/or firmware and/or hardware or any combination thereof.

Figure 5:
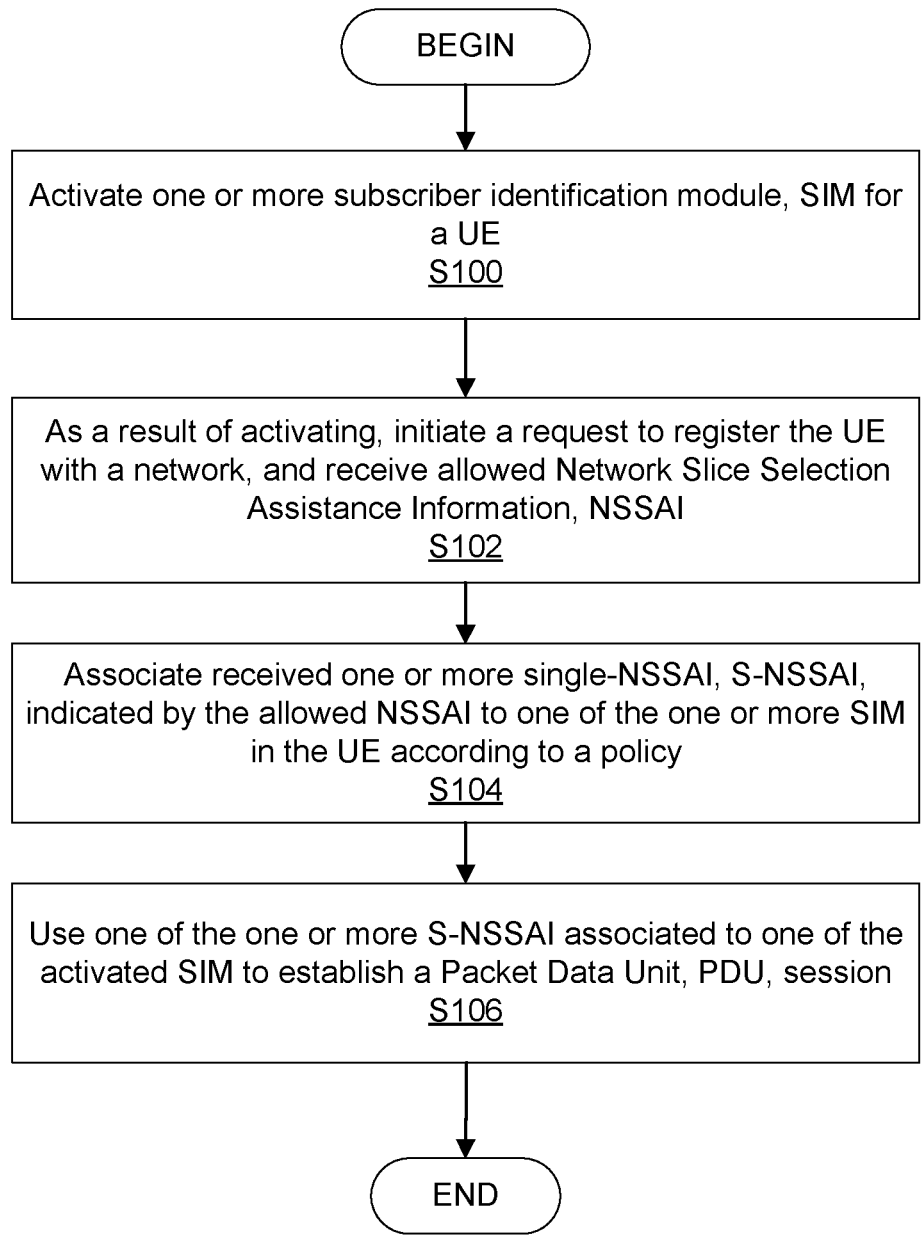
FIG. 5 is a flowchart of an example method for a UE according to one embodiment of the present disclosure.

FIG. 5 is a flowchart of an exemplary process in a user equipment 22 according to some embodiments of the present disclosure. One or more Blocks and/or functions and/or methods performed by UE 22 may be performed by one or more elements of UE 22 such as by associator unit 34 in processing circuitry 84, processor 86, radio interface 82, etc. The example method includes activating (Block S100), such as via associator unit 34, processing circuitry 84, processor 86 and/or radio interface 82, one or more subscriber identification module, SIM 85 for a UE 22. The method includes, as a result of activating, initiating (Block S102), such as via associator unit 34, processing circuitry 84, processor 86 and/or radio interface 82, a request to register the UE 22 with a network, and receiving allowed Network Slice Selection Assistance Information, NSSAI. The method includes associating (Block S104), such as via associator unit 34, processing circuitry 84, processor 86 and/or radio interface 82, received one or more single-NSSAI, S-NSSAI, indicated by the allowed NSSAI to one of the one or more SIM 85 in the UE 22 according to a policy. The method includes using (Block S106), such as via associator unit 34, processing circuitry 84, processor 86 and/or radio interface 82, one of the one or more S-NSSAI associated to one of the activated SIM 85 to establish a Packet Data Unit, PDU, session.

It should be understood that generally slices (or S-NSSAIs identifying slices) are not to be shared across SIMs in the UE 22, but rather the association of S-NSSAIs is to the activated SIM. For example, in some embodiments, the associating the received one or more S-NSSAI indicated by the allowed NSSAI to one of the one or more SIM further includes associating all or a subset of the S-NSSAI indicated by the allowed NSSAI per SIM. In yet another illustrative example, when an activation pattern/code is used by a user to unlock a screen and/or activate 2 SIMs 85 in a dual-SIM UE 22, each SIM 85 will register with the respective network that the particular SIM 85 is subscribed for. If both networks are 5GS, then there will be slices associated with each SIM maintained separately. If the activation pattern/code further includes some slice limitations (from the allowed slices/NSSAIs) then several options are possible here, which may include one or more of the following:

- The activation pattern/code may enable or cause the UE 22 to associate a subset of the allowed slices/NSSAIs to the activated SIM.
- The activation pattern/code may enable or cause the UE 22 to associate a subset of the allowed slices only for one SIM. This may imply that for the other SIM all allowed slices can be used.
- The activation pattern/code may enable or cause the UE 22 to activate just the SIMs (and all allowed slices can be used by both SIMS for a PDU session).

Again, each SIM has its own separate registration to a network (which may be the same or different as between SIMs) and each SIM has its own set of allowed NSSAIs (which are generally indicated in the registration response message from the network). In some embodiments, if one of the SIMs subscribes to EPS there may be no slices in this case for EPS.

In some embodiments, activating the one or more SIM 85 corresponds to unlocking, such as via associator unit 34, processing circuitry 84, processor 86 and/or radio interface 82, the one or more SIM 85 via one or more corresponding configured and stored swipe pattern. In some embodiments, the method further includes associating, such as via associator unit 34, processing circuitry 84, processor 86 and/or radio interface 82, each of the S-NSSAI of the allowed NSSAI with an activation code or an activation pattern for the activated SIM. In some embodiments, the activation pattern includes a swipe pattern to activate a particular slice identified by an S-NSSAI.

In some embodiments, using one of the one or more S-NSSAI associated to the one of the activated SIM 85 to establish the PDU session is enabled by activating an activation code or an activation pattern associated with the S-NSSAI (of the activated SIM). In some embodiments, the policy is one of a pre-configured UE rule and a UE Route Selection Policy, URSP, rule. In some embodiments, the method further includes, informing, such as via associator unit 34, processing circuitry 84, processor 86 and/or radio interface 82, an application that the association of the application to the PDU session failed if at least one of the one of the one or more S-NSSAI is associated to an inactive SIM 85, and the one of the one or more S-NSSAI is not enabled in the activated SIM.

In some embodiments, the method further includes configuring, such as via associator unit 34, processing circuitry 84, processor 86 and/or radio interface 82, a first SIM of the one or more SIM 85 to be activated if a user-input matches at least a first display unlock pattern; and configuring a second SIM of the one or more SIM 85 to be activated if the user-input matches at least a second display unlock pattern, the second display unlock pattern being different from the first display unlock pattern.

Having described the general process flow of arrangements of the disclosure and having provided examples of hardware and software arrangements for implementing the processes and functions of the disclosure, the sections below provide details and examples of arrangements for slice and/or subscriber identification module (SIM) device locking/unlocking, which may be implemented by the network node 16 and user equipment 22.

In some embodiments, for multi-SIM UEs 22, there is configured and stored an association of a specific unlock pattern per SIM 85. In some embodiments, the UE 22 may be configured to associate a specific unlock pattern for all or a subset of the SIMs 85 in the UE 22. The SIMs 85 in the UE 22 may be associated with a single or more than one operator. In some embodiments, at least some of the techniques disclosed herein may be considered a pattern-based SIM selection in which, for example, a pattern (e.g., swipe pattern, PIN, password, code, etc.) is mapped to SIM activation. In some embodiments, a pattern may be mapped to one or more specific slices, associated with an activated SIM (s). For example, a specific unlock pattern may activate a SIM and associate a subset of N-SSAIs to the activated SIM, while another different unlock pattern may activate the SIM but associate a different set of N-SSAIs to the activated SIM. This embodiment may be particularly useful for shared UEs 22, but may also be useful for non-shared UEs 22 as well.

A pattern, as used herein, may be considered different from, e.g., an operating system menu, application or web user interface (UI). In some embodiments, the term pattern may be considered a particular way in which something is done or organized, or in which something happens, such as a swiping pattern for SIM selection. Use of patterns as disclosed herein, instead of an operating system (OS) menu or web UI, may improve the user experience, since it reduces number of steps otherwise involved to explicitly select another SIM 85 or slice by the user at the UE 22. For example, accessing an OS menu or web UI may involve several clicks/taps through different levels until the appropriate menu option is reached, whereas a display unlock screen is generally at the top level even above the home screen and is therefore more easily accessible to the user and requires less clicks/taps.

In some embodiments, the patterns may be used according to one or more of the following:

The user configures and stores a particular pattern per SIM 85. Once the user uses/inputs the pattern associated with the SIM 85 then only that SIM 85 is activated and the UE 22 may register with a network (e.g., 5G system) and establish a PDU session using a default slice that is associated to the activated SIM 85.

In some embodiments, the UE 22 may have a pattern associated with both SIMs 85, if the UE 22 supports that, in which case both (or all as in the case of more than 2 SIMs 85) SIMs 85 may be activated by the user input activation pattern or code, each SIM 85 registering and establishing its respective 5GS PDU sessions e.g., using the slices identified by S-NSSAIs that are associated to the respective SIM 85.

For multi-SIM UEs 22, in some embodiments, it may be possible to associate a specific unlocking pattern per SIM 85 and/or to further associate a specific display screen unlocking pattern per one or set of network slice(s) and/or a specific display screen unlocking pattern per subset or all network slices, e.g., identifies by the allowed NSSAI. In some embodiments, when a particular SIM 85 in the UE 22 is activated by a user-input unlock pattern, the UE 22 may subsequently receive an indication of the allowed S-NSSAI(s) (e.g., up to 8 S-NSSAI) returned in the registration response at the 5GC registration. In some embodiments, the UE 22 may determine which of the allowed S-NSSAIs are to be associated to the activated SIM 85 in the UE 22 and the UE 22 may then establish a PDU session using only a slice that is indicated by the S-NSSAI that is associated to the activated SIM 85. When the SIM 85 is deactivated, the slice(s) that are associated to it may not be used to establish a PDU session (e.g., a PDU session establishment failure may occur at the UE 22). Stated another way, if the S-NSSAI is not associated to or enabled in the activated SIM 85, then the UE 22 may fail to establish the PDU session.

In a shared UE 22 (e.g., a family tablet), the UE 22 may be configured such that a user may select to enable locks on a few slices which the user regularly uses. Taking a common case of "shared device" like an iPad, where multiple users access the same device, users may select to activate slice(s) for the particular user's use, using different unlock patterns with respect to the SIM(s) 85 allocated to the user. Such users may exercise their swipe pattern to unlock the user's particular SIM 85 or to be able to use the user's set of slice(s) with the activated SIM 85.

Figure 6:
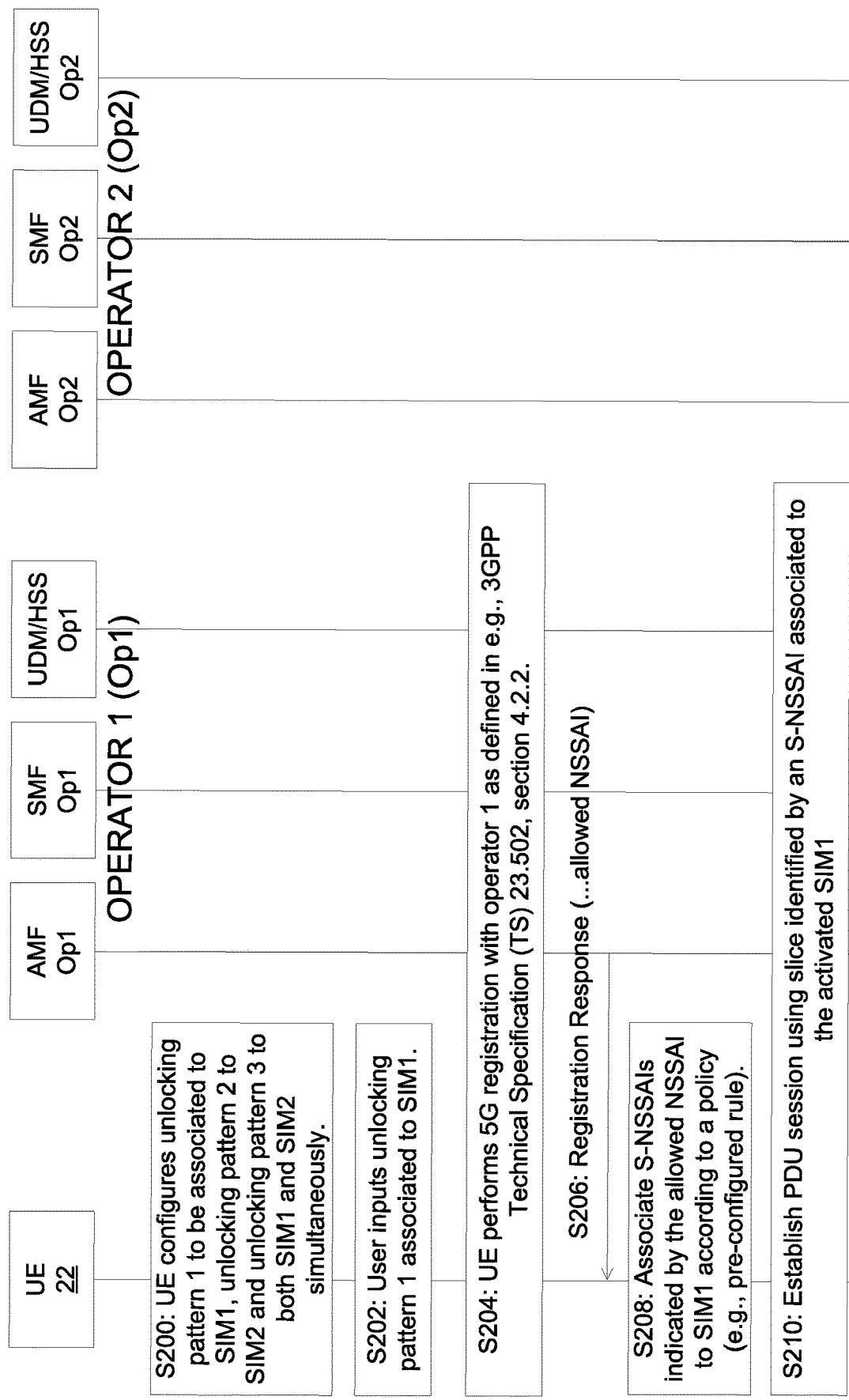
FIG. 6 is a call flow diagram illustrating an example process according to one embodiment of the present disclosure.
Figure 7:
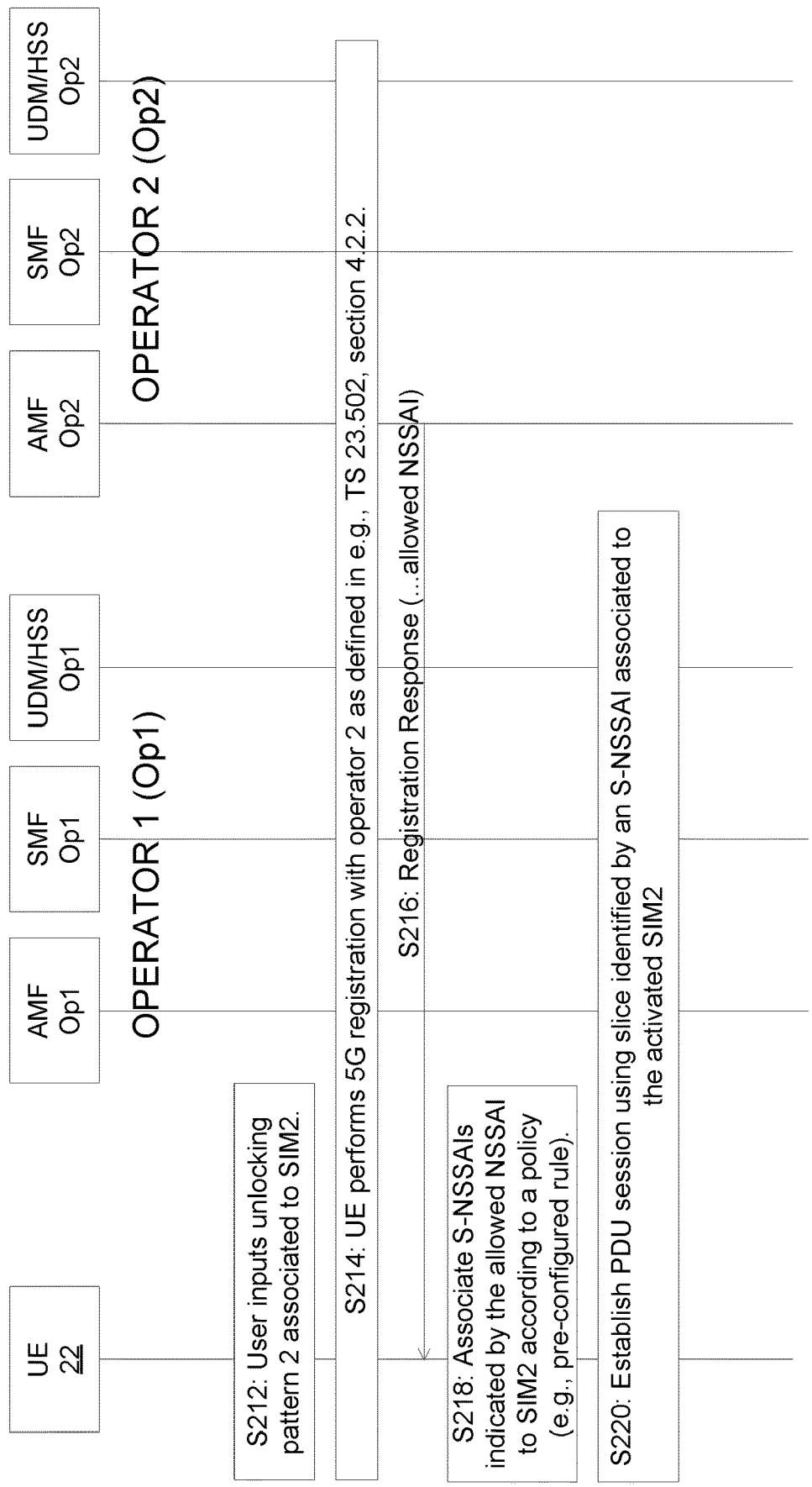
FIG. 7 is a continuation of the call flow diagram of FIG. 6.

In some embodiments, messages exchanged between a UE 22 and MNO, after the UE 22 display screen unlocking by the user, may support the proper network slice and/or SIM 85 being activated. FIGS. 6 and 7 are a call flow diagram and a continuation of the call flow diagram, respectively, which illustrate an example process of at least some of the techniques disclosed herein. The call flow may support a single-SIM or a multi-SIM UE 22. In some embodiments, once a SIM 85 is activated, the procedures for registering with a network, such as, 5G may be the same as existing registration procedures. In some embodiments, once a SIM 85 is activated the procedures for establishing the packet data network (PDN) connections may be the same as existing procedures. In some embodiments, there may be updates to PDN establishment at the UE 22 in that, for example, the session establishment may fail if the slice indicated by the S-NSSAI is not enabled in the activated SIM 85.

Referring now to FIG. 6, in step S200, the UE 22 may be configured with unlocking pattern 1 to be associated to SIM1, with unlocking pattern 2 to be associated to SIM2 and with unlocking pattern 3 to be associated to both SIM1 and SIM2 simultaneously. In some embodiments, the configuration and specific associations of unlocking pattern to SIM 85 may be initiated and/or selected by the user via e.g., a UE display screen unlock configuration. In step S202, after the configuration is stored, the user inputs unlocking pattern 1 (e.g., by inputting swipe pattern 1 via the display screen) which is associated to SIM1. In step S204, the UE 22 performs a 5G registration with operator 1 as defined in, e.g., 3GPP Technical Specification (TS) 23.502, section 4.2.2. In step S206, the UE 22 receives a registration response that includes the allowed NSSAI. In step 208, the UE 22 associates the S-NSSAI indicated by the allowed NSSAI to the activated SIM1 according to a policy (e.g., pre-configured UE rule at the UE 22, or in some embodiments a URSP policy, which may be received from a policy control function). As one example, the UE 22 may enforce the slice restriction if for example the UE 22 initiated an application that the URSP policy required the use of a slice not allowed by the swipe. In other embodiments, enforcement of the slice restriction per swipe pattern may be based on a pre-configured UE rule that does not involve a URSP policy from the PCF.

In step 210, a PDU session is established using one slice identified by an S-NSSAI indicated by the allowed NSSAI and associated to the activated SIM1, as a result of the unlocking pattern 1.

In FIG. 7, which is a continuation of the call flow diagram of FIG. 6, in step S212, the user next inputs unlocking pattern 2 (e.g., swipe pattern 2) which is associated to SIM2. In step S214, the UE 22 performs a 5G registration with operator 2 as defined in e.g., TS 23.502, section 4.2.2. In step S216, the UE 22 receives a registration response that includes the allowed NSSAI. In step 218, the UE 22 associates the S-NSSAI indicated by the allowed NSSAI to the activated SIM2 according to a policy (e.g., pre-configured UE rule or URSP policy, which may be received from a policy control function). In step 220, a PDU session is established using one slice identified by an S-NSSAI indicated by the allowed NSSAI and associated to the activated SIM2, as a result of the unlocking pattern 2.

Figure 8:
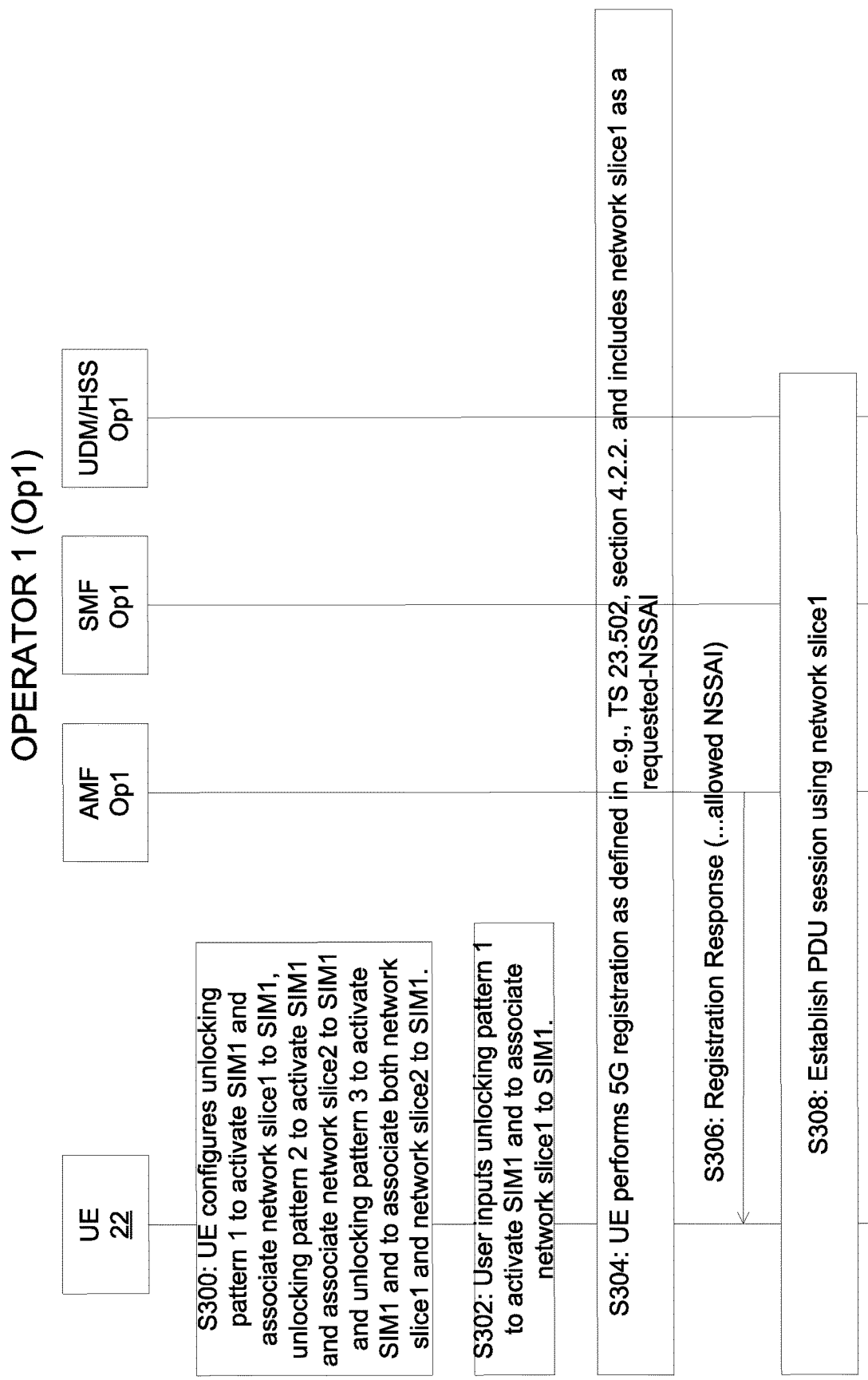
FIG. 8 is a call flow diagram illustrating yet another example process according to one embodiment of the present disclosure.

A call flow diagram illustrating an example of how particular network slices may be mapped or associated to a particular activation pattern/code and/or user, e.g., for shared devices, is shown in FIG. 8. In step S300, the UE 22 may be configured with unlocking pattern 1 to activate SIM1 and associate network slice1 to SIM1, unlocking pattern 2 to active SIM1 and to associate network slice2 to SIM1 and unlocking pattern 3 to activate SIM1 and to associate both network slice1 and network slice2 to SIM1 simultaneously. In some embodiments, the configuration and specific associations of unlocking pattern(s) to slice(s) may be initiated and/or selected by the user via e.g., a UE display screen unlock configuration. In step S302, the user inputs unlocking pattern 1 to activate SIM1 and to associate network slice1 to SIM1. In step S304, the UE 22 performs a 5G registration with operator 1 as defined in e.g., TS 23.502, section 4.2.2, and the UE 22 may include network slice1 as a requested-NSSAI e.g., as a result of the unlocking pattern 1 being input by the user.

As an example of a shared UE 22 use case, unlocking pattern 1 may be allocated or assigned or configured to a user 1 (e.g., child1), whereas unlocking pattern 2 may be assigned or configured to a user 2 (e.g., child2) and unlocking pattern 3 may be assigned or configured to an administrative or managing user (e.g., parental user) since both network slices 1 and 2 can be used if unlocking pattern 3 is input by the user. In step S306, the UE 22 receives a registration response that includes the allowed NSSAI. In step S308, the UE 22 establishes a PDU session using the S-NSSAI indicating network slice1 e.g., since network slice1 is associated to activated SIM1, per the unlocking pattern 1 configuration.

In some embodiments, if user 1 attempts to use services that are not supported by network slice1 then the application that user 1 is attempting to access may be informed that the association of the application to a PDU session failed due to e.g., the S-NSSAI not being enable by or associated to the activated SIM1. On the other hand, if user 3 (e.g., the parental user) inputs unlocking pattern 3 then both network slice 1 and network slice 2 may be used for services and if user 3 attempts to access the application, the PDU session may be successfully established (e.g., assuming network slice 2 does support the services for the application).

The call flow diagrams above are non-limiting examples of how at least some of the techniques in the present disclosure may be used at a UE for network communications.

It should be understood that an activation pattern/code may be used in different ways according to the various embodiments and arrangements disclosed herein. For example, in some embodiments, a single activation pattern/code may active two or more SIMs simultaneously. In some embodiments, a single activation pattern/code may active two or more SIMs as well as some slices enabled within each SIM. In some embodiments, an activation pattern/code may activate a single SIM and all the slices indicated by the allowed NSSAI. In some embodiments, an activation pattern/code may activate a single SIM and only a subset of the slices indicated by the allowed NSSAI.

Some embodiments of the present disclosure advantageously provide arrangements for activating a SIM in a UE using e.g., an activation pattern/code for unlocking a display screen and may further include enabling use of all or a subset of slices for a PDU session via the activation pattern/code.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method performed by a user equipment, (UE) having one or more subscriber identification modules (SIMs), the method comprising:
    activating, via an activation code or an activation pattern, one or more SIMs for a UE;
    as a result of activating, initiating a request to register the UE with a network, and receiving allowed Network Slice Selection Assistance Information (NSSAI);
    associating received one or more single-NSSAI (S-NSSAI) indicated by the allowed NSSAI to one of the one or more SIMs in the UE according to a policy so that,
        as a result of the activation of the one or more SIMs via the activation code or the activation pattern, all of the S-NSSAI indicated by the allowed NSSAI are associated to the activated one or more SIMs, or
        as a result of the activation of the one or more SIMs via the activation code or the activation pattern, a subset of the S-NSSAI indicated by the allowed NSSAI are associated to the activated one or more SIMs according to the policy;
    using one of the one or more S-NSSAI associated to one of the activated one or more SIMs to establish a Packet Data Unit (PDU) session; and
    one SIM having multiple activation codes or activation patterns, and each activation code or activation pattern being associated with a corresponding subset of allowed NSSAI or all the allowed NSSAI.

2. The method of claim 1, wherein the policy is one of a pre-configured UE rule and a UE Route Selection Policy (URSP) rule.

3. The method of claim 1, further comprising:
    informing an application that the association of the application to the PDU session failed if at least one of:
        the one of the one or more S-NSSAI is associated to an inactive SIM; and
        the one of the one or more S-NSSAI is not associated to the activated one or more SIMs.

4. The method of claim 1, wherein the activation code or activation pattern activates multiple SIMs, and the associating of the received one or more S-NSSAI indicated by the allowed NSSAI to one of the one or more SIMs further includes associating all or a subset of the S-NSSAI indicated by the allowed NSSAI per SIM.

5. The method of claim 1, wherein the activation pattern is one of a swipe pattern, a PIN or a biometric pattern.

6. The method of claim 1, wherein the activation code or activation pattern is configured by a user.

7. The method of claim 1, wherein the activation code or activation pattern is a display unlock pattern.

8. The method of claim 1, further comprising inputting a display screen unlock pattern by a user to switch between at least one SIM and network slices, a network slice being identified by an S-NSSAI.

9. The method of claim 1, wherein establishing the PDU session fails if the S-NSSAI used to establish the PDU session is not associated with the activated one or more SIMs.

10. A user equipment (UE) with one or more subscriber identification modules (SIMs) and comprising processing circuitry, the processing circuitry configured to cause the UE to:

activate, via an activation code or an activation pattern, one or more SIMs for a UE;

as a result of activating, initiate a request to register the UE with a network, and receive allowed Network Slice Selection Assistance Information (NSSAI);

associate received one or more single-NSSAI (S-NSSAI) indicated by the allowed NSSAI to one of the one or more SIMs in the UE according to a policy so that, as a result of the activation of the one or more SIMs via the activation code or the activation pattern, all of the S-NSSAI indicated by the allowed NSSAI are associated to the activated one or more SIMs, or as a result of the activation of the one or more SIMs via the activation code or the activation pattern, a subset of the S-NSSAI indicated by the allowed NSSAI are associated to the activated one or more SIMs according to the policy;

use one of the one or more S-NSSAI associated to one of the activated one or more SIMs to establish a Packet Data Unit (PDU) session; and one SIM having multiple activation codes or activation patterns, and each activation code or activation pattern being associated to a corresponding subset of allowed NSSAI or all the allowed NSSAI.

11. The user equipment of claim 10, wherein the policy is one of a pre-configured UE rule and a UE Route Selection Policy (URSP) rule.

12. The user equipment of claim 10, wherein the processing circuitry is further configured to cause the UE to:

inform an application that the association of the application to the PDU session failed if at least one of:

the one of the one or more S-NSSAI is associated to an inactive SIM; and the one of the one or more S-NSSAI is not associated to the activated one or more SIMs.

13. A non-transitory computer readable storage medium containing a computer program comprising instructions which when executed on at least one processor causes the at least one processor to carry out a method, the method comprising:

activating, via an activation code or an activation pattern, one or more subscriber identification modules (SIMs) for a user equipment (UE);

as a result of activating, initiating a request to register the UE with a network, and receiving allowed Network Slice Selection Assistance (NSSAI);

associating received one or more single-NSSAI (S-NSSAI) indicated by the allowed NSSAI to one of the one or more SIMs in the UE according to a policy so that, as a result of the activation of the one or more SIMs via the activation code or the activation pattern, all of the S-NSSAI indicated by the allowed NSSAI are associated to the activated one or more SIMs, or as a result of the activation of the one or more SIMs via the activation code or the activation pattern, a subset of the S-NSSAI indicated by the allowed NSSAI are associated to the activated one or more SIMs according to the policy; and using one of the one or more S-NSSAI associated to one of the activated one or more SIMs to establish a Packet Data Unit (PDU) session, one SIM having multiple activation codes or activation patterns, and each activation code or activation pattern being associated to a corresponding subset of allowed NSSAI or all the allowed NSSAI.

\* \* \* \* \*